United States Patent
Ohara et al.

(10) Patent No.: US 6,896,485 B2
(45) Date of Patent: May 24, 2005

(54) COMBUSTION ENGINE, GAS TURBINE, AND POLISHING LAYER

(75) Inventors: Minoru Ohara, Hyogo (JP); Masahiko Mega, Hyogo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 10/258,744

(22) PCT Filed: Feb. 27, 2002

(86) PCT No.: PCT/JP02/01788

§ 371 (c)(1),
(2), (4) Date: Apr. 29, 2003

(87) PCT Pub. No.: WO02/068799

PCT Pub. Date: Sep. 6, 2002

(65) Prior Publication Data

US 2004/0096318 A1 May 20, 2004

(30) Foreign Application Priority Data

Feb. 28, 2001 (JP) ........................ 2001-053740

(51) Int. Cl.[7] .............................................. F01D 11/08
(52) U.S. Cl. ............................ 415/173.4; 416/241 B; 416/241 R
(58) Field of Search ................... 416/241 B, 241 R; 415/173.4, 174.4, 172 A, 173.1, 228 R, 172 R, 174

(56) References Cited

U.S. PATENT DOCUMENTS

| | | | |
|---|---|---|---|
| 4,169,020 A | | 9/1979 | Stalker et al. |
| 4,249,913 A | | 2/1981 | Johnson et al. |
| 4,735,656 A | | 4/1988 | Schaefer et al. |
| 5,076,897 A | | 12/1991 | Wride et al. |
| 5,702,574 A | | 12/1997 | Foster et al. |
| 5,780,116 A | * | 7/1998 | Sileo et al. .................. 427/456 |
| 5,879,753 A | * | 3/1999 | Zajchowski et al. ......... 427/454 |
| 5,935,407 A | * | 8/1999 | Nenov et al. ................ 205/183 |
| 5,952,110 A | | 9/1999 | Schell et al. |
| 5,997,248 A | * | 12/1999 | Ghasripoor et al. ...... 415/173.4 |
| 6,171,351 B1 | * | 1/2001 | Schroder et al. ............... 51/295 |
| 6,194,086 B1 | * | 2/2001 | Nenov et al. ................ 428/621 |

FOREIGN PATENT DOCUMENTS

| | | |
|---|---|---|
| EP | 0 273 854 | 7/1988 |
| EP | 484115 | 5/1992 |
| EP | 0 573 928 | 12/1993 |
| EP | 1 367 147 | 12/2003 |
| JP | 10-030403 | 2/1998 |
| JP | 2002 105666 | 4/2002 |
| WO | 94 19583 | 9/1994 |
| WO | WO 02/097160 | 12/2002 |

* cited by examiner

*Primary Examiner*—F. Daniel Lopez
*Assistant Examiner*—James M. McAleenan
(74) *Attorney, Agent, or Firm*—Oblon, Spivak, McClelland, Maier & Neustadt, P.C.

(57) ABSTRACT

The present invention provides a gas turbine in which a proper clearance is kept between a rotor blade and a shroud for a long period of time from the operation start, so that damage to the rotor blade is less liable to occur. In a turbine portion of the gas turbine in accordance with the present invention, the rotor blade and the shroud face each other. At the tip end of the rotor blade is formed an abrasive layer, and on the inner peripheral surface of the shroud is formed a heat insulating layer. The abrasive layer is formed of a matrix and many abrasive particles dispersed in the matrix. The abrasive particles include protruding particles protruding from the matrix and embedded particles embedded in the matrix. In initial sliding of the rotor blade and the shroud at the early stage of operation, the inner peripheral surface of the shroud is ground by the protruding particles. After the protruding particles have disappeared, the inner peripheral surface of the shroud is ground by the embedded particles.

24 Claims, 3 Drawing Sheets

COMBUSTION ENGINE, GAS TURBINE, AND POLISHING LAYER

TECHNICAL FIELD

The present invention relates to a combustion engine and a gas turbine having an abrasive layer formed on the surface of either one of a movable portion and a non-movable portion facing each other, such as a shroud formed at the tip end of a turbine rotor blade or around a rotor blade provided in a combustion engine such as a jet engine and a gas turbine, and an abrasive layer.

BACKGROUND ART

Between the tip end of a rotor blade of a gas turbine and a shroud facing the tip end of the rotor blade, a clearance of a predetermined size is provided to prevent the tip end of the rotor blade from coming into contact with the shroud during the operation. If the clearance is too large, combustion gas leaks from the pressure surface side to the negative pressure surface side of the rotor blade, so that a pressure loss increases, and thus the operation efficiency of gas turbine decreases. In order to prevent this phenomenon and to thereby improve the performance of gas turbine, attempts have been made to set the clearance at the minimum.

If the clearance is too small, at the early stage of operation start of gas turbine, the tip end of rotor blade and the shroud slide on each other due to thermal expansion of rotor blade, eccentricity of turbine rotor, vibrations occurring in the whole of gas turbine, etc. (what is called initial sliding). Also, if the gas turbine is operated for a long period of time, the shroud exposed to a high-temperature gas is gradually subjected to thermal deformation, which sometimes causes sliding of the tip end of rotor blade and the shroud (what is called secondary sliding). Heavy sliding of the tip end of rotor blade and the shroud occurs at the time of initial sliding. Contrarily, the secondary sliding is relatively moderate.

Generally, the shroud is provided with a coating layer, which is formed to shut off heat or prevent oxidation, on the inner peripheral surface thereof. For example, for the purpose of heat insulation, a TBC (Thermal Barrier Coating) is provided, or an oxidation-resistant coating formed of M-Cr—Al—Y (hereinafter referred to as MCrAlY) is provided. In many cases, these coatings have a high hardness. Therefore, if the tip end of rotor blade slides on the inner peripheral surface of shroud, the rotor blade may be damaged greatly.

Japanese Patent Provisional Publication No. 4-218698 (No. 218698/1992), National Publication of International Patent Application No. 9-504340 (No. 504340/1997), Japanese Patent Provisional Publication No. 10-30403 (No. 30403/1998), and U.S. Pat. No. 5,702,574 have disclosed a rotor blade having an abrasive layer in which abrasive particles are dispersed in a matrix consisting of MCrAlY, which is an oxidation inhibiting material. For this rotor blade, as the abrasive particles, for example, cubic boron nitride (CBN) is used. The cubic boron nitride is a hard material. Therefore, if the tip end of rotor blade slides on the inner peripheral surface of shroud, the abrasive particles consisting of cubic boron nitride grinds the inner peripheral surface of shroud. Thereby, a proper clearance is kept between the rotor blade and the shroud.

However, since the cubic boron nitride has insufficient heat resistance, it is turned into boron oxide and sublimated by a long-term operation in an oxidizing atmosphere, so that the abrasive particles sometimes disappear. Also, the abrasive particles sometimes fall off gradually as MCrAlY is deteriorated by oxidation. Therefore, at the time of initial sliding, the shroud is ground by the abrasive particles. However, in the secondary sliding after the abrasive layer has been deteriorated, the grinding is insufficient, so that the rotor blade may be damaged greatly. In particular, in recent years, a tendency for the combustion temperature in a gas turbine to increase from the viewpoint of the improvement in energy efficiency has been found, which makes a problem of heat deterioration in abrasive layer remarkable. The same problem can be found in a combustion engine such as a jet engine.

DISCLOSURE OF THE INVENTION

The present invention has been made in view of the above problems, and accordingly an object thereof is to provide a combustion engine (for example, a gas turbine) in which a proper clearance is kept between a movable portion (for example, a rotor blade) and a non-movable portion (for example, a shroud) for a long period of time from the operation start, a combustion engine and a gas turbine which have an abrasive layer suitable for the above-described combustion engine, and an abrasive layer used for these engines.

To achieve the above object, the present invention provides a combustion engine comprising a compressor, a combustor, and a turbine portion, the turbine portion having a rotor blade and a shroud facing the tip end of the rotor blade, characterized in that an abrasive layer having a matrix and many abrasive particles dispersed in the matrix is formed at a tip end portion of the rotor blade, and some of the abrasive particles are dispersed so as to protrude from the matrix, and the remaining abrasive particles are dispersed so as to be embedded in the matrix.

The abrasive layer of combustion engine is provided with particles a part of which protrudes from the surface of matrix from the first (referred also to as "protruding particles") and particles which are embedded in the matrix at first (referred also to as "embedded particles"). Therefore, at the time of initial sliding, the protruding particles grind the inner peripheral surface of the shroud. Also, after the protruding particles have disappeared or fallen off, the matrix disappears due to oxidation etc. and is worn by the slide on the coating of the mating shroud, and accordingly the embedded particles appear partially on the surface of the abrasive layer, whereby the inner peripheral surface of the shroud is ground. Therefore, a proper clearance is kept between the rotor blade and the shroud for a long period of time from the operation start, and thus damage to the rotor blade is prevented.

The ratio (Np/Nb) of the number of protruding particles (Np) to the number of embedded particles (Nb) is preferably not lower than 30/70 and not higher than 80/20. Thereby, high grinding performance continues to be exhibited for a long period of time.

The mixing of protruding particles and embedded particles is easily achieved by the use of two or more kinds of abrasive particles having different particle size distribution. Specifically, abrasive particles that pass through #80 mesh but do not pass through #100 mesh and abrasive particles that pass through #100 mesh but do not pass through #120 mesh have only to be mixedly used. Also, from another viewpoint, the particle size distribution has only to be regulated so that the average particle diameter of protruding particles is not smaller than 150 $\mu$m and not larger than 200 $\mu$m, and the average particle diameter of embedded particles is not smaller than 80 $\mu$m and not larger than 150 $\mu$m.

When the average particle diameter of abrasive particles protruding from the matrix is taken as D, and the protrusion dimension thereof is taken as P, the ratio of the average particle diameter D to the protrusion dimension P is preferably not lower than 25% and not higher than 70%. Thereby, even if the tip end of the rotor blade slides heavily on the shroud at the time of initial sliding, the inner peripheral surface of the shroud is ground efficiently.

The abrasive particles have a hardness higher than that of a material forming the inner peripheral surface of the shroud. Thereby, the inner peripheral surface of the shroud is ground reliably. Specifically, in the case where the inner peripheral surface of the shroud is a coating layer formed mainly of zirconia ($ZrO_2$), cubic boron nitride particles, alumina particles, silicon carbide particles, or sintered diamond particles are well-suited. For these particles, one kind or two or more kinds may be used jointly. For alumina particles, however, a blocky shape having an aspect ratio of nearly 1 is desirable though they usually have a flat shape.

The porosity of the matrix is preferably not higher than 1%. Thereby, deterioration in the matrix due to oxidation is prevented more surely, and thus the falling-off of the abrasive particles is restrained. The matrix is preferably formed mainly of MCrAlY. The "M" in MCrAlY means one kind or two or more kinds of metal elements selected from a group consisting of iron, nickel, and cobalt. Specifically, the MCrAlY is an alloy formed mainly of iron, nickel or cobalt, chromium (Cr), aluminum (Al), and yttrium (Y).

There is also a combustion engine in which the rotor blade is provided with a ridge portion, which protrudes outward in the radial direction, at the tip end thereof. In the combustion engine of this type, the sliding of the ridge portion and the inner peripheral surface of shroud poses a problem. Therefore, the abrasive layer has only to be formed at the tip end of the ridge.

The above-described abrasive layer is applied to all types of combustion engines in which the turbine portion has the movable portion and the non-movable portion facing each other. Specifically, the abrasive layer is formed on either one of a surface facing the non-movable portion of the movable portion and a surface facing the movable portion of the non-movable portion. For example, the abrasive layer may be formed on the inner peripheral surface of the shroud. In this case, the tip end of the rotor blade is ground by sliding.

Also, the above-described abrasive layer is well-suited to a gas turbine which has a tendency for the temperature of combustion gas to be high among the combustion engines. In particular, in a gas turbine in which the temperature of combustion gas produced in the combustor (temperature at the inlet of the turbine portion) is not lower than 1200° C., the effect of keeping the clearance can be achieved remarkably.

BEST MODE FOR CARRYING OUT THE INVENTION

A combustion engine, a gas turbine, and an abrasive layer in accordance with the present invention will now be described with reference to the accompanying drawings.

Figure 1:
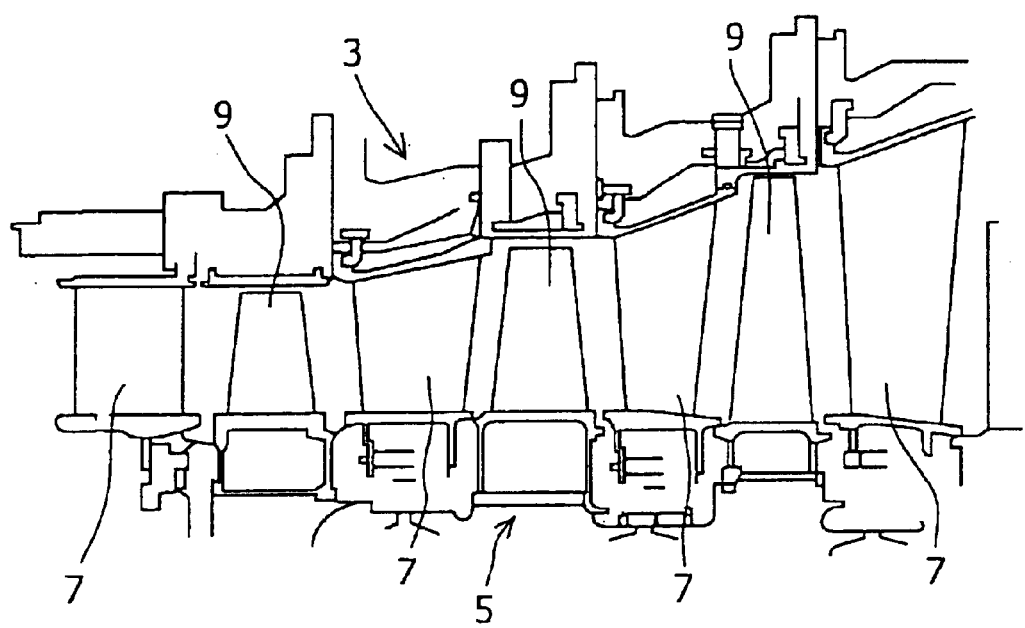
FIG. 1 is a partially sectional view of a turbine portion of a gas turbine in accordance with one embodiment of the present invention, in which the turbine portion is cut in the axial direction.

FIG. 1 is a partially sectional view of a turbine portion 1 of a gas turbine in accordance with one embodiment of the present invention, in which the turbine portion 1 is cut in the axial direction.

This turbine portion 1 includes a shroud 3, a rotor 5, a plurality of stator blades 7, and a plurality of rotor blades 9 planted in the rotor 5. The stator blades 7 and the rotor blades 9 are arranged alternately in the axial direction (right-and-left direction in FIG. 1). Although not shown in the figure, the gas turbine is provided with a compressor and a combustor on the upstream side (that is, the left-hand side) of the turbine portion 1.

Air is compressed in the compressor, and the compressed air is sent into the combustor. In the combustor, a fuel is mixed with the compressed air, and the fuel-air mixture is burned continuously. The combustion produces a high-temperature and high-pressure combustion gas, which is supplied to the turbine portion 1. The combustion gas flows from left to right in FIG. 1, whereby the rotor blades 9 and the rotor 5 are rotated to generate electricity. The temperature of the combustion gas at the inlet of the turbine portion 1 has so far been about 1000° C. However, a tendency for the temperature to increase from the viewpoint of the improvement in energy efficiency. In recent years, a gas turbine in which the temperature of combustion gas reaches 1300° C. has been developed, and also a gas turbine in which the temperature of combustion gas reaches 1500° C. has been proposed.

Figure 2:
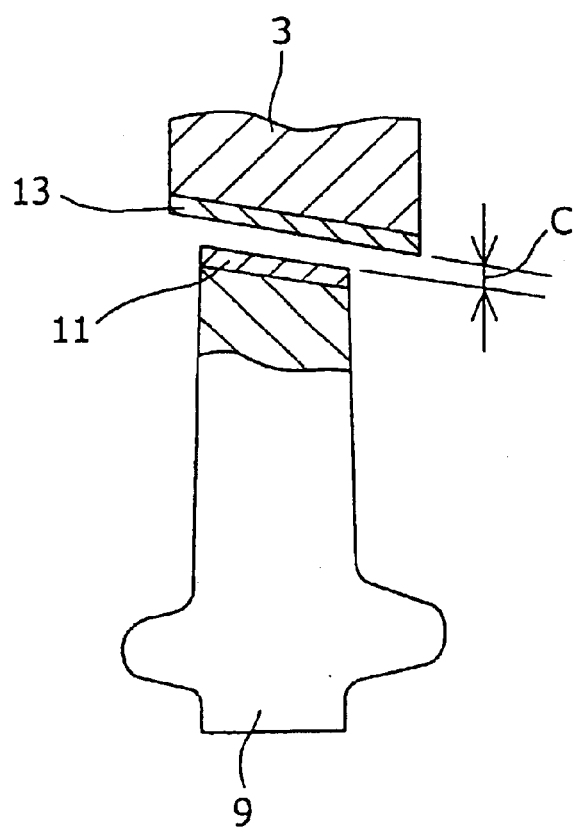
FIG. 2 is an enlarged sectional view of a part of the turbine portion shown in FIG. 1.

FIG. 2 is an enlarged sectional view of a part of the turbine portion 1 shown in FIG. 1, in which the rotor blade 9 and the shroud 3 are shown. The rotor blade 9 is provided with an abrasive layer 11 at the tip end thereof. The shroud 3 is provided with a heat insulating layer, which is formed mainly of zirconia, or an MCrAlY layer 13 on the inner peripheral surface thereof. A distance between the abrasive layer 11 and the heat insulating layer 13 (indicated by the arrow mark C in FIG. 1) is a clearance C.

Figure 3:
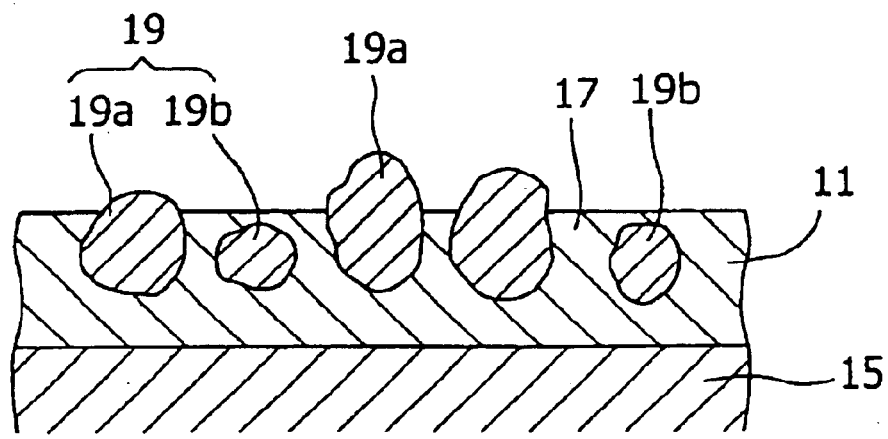
FIG. 3 is an enlarged sectional view of a part of a tip end portion of a rotor blade shown in FIG. 2.

FIG. 3 is an enlarged sectional view of a part of a tip end portion of the rotor blade 9 shown in FIG. 2, in which a base material 15 of the rotor blade 9 and the abrasive layer 11 are shown. Although not shown in the figure, the shroud 3 is located at the upper part of this figure with the clearance C being provided.

The abrasive layer 11 is made up of a matrix 17 and abrasive particles 19 dispersed in the matrix 17. The abrasive particles 19 include protruding particles 19a the upper end of which protrudes from the matrix 17 and embedded particles 19b the whole of which is embedded in the matrix 17. At the initial sliding of the rotor blade 9 in the early stage of operation, the protruding particles 19a come into contact with the inner peripheral surface of the shroud 3. By this contact, the inner peripheral surface of the shroud 3 is ground, by which a proper clearance C is kept between the tip end of the rotor blade 9 and the inner peripheral surface of the shroud 3. When the operation is continued for a long period of time, the protruding particles 19a may disappear due to sublimation etc. Also, since the interior of the shroud 3 is in an oxidizing atmosphere, the matrix 17 deteriorates and disappears, and accordingly the protruding particles 19a may fall off gradually. Even in this case, the embedded particles 19b scarcely deteriorate and remain because they are protected by the matrix 17.

Before long, the matrix 17 oxidizes or disappear due to the contact with and slide on the mating shroud, by which the upper ends of the embedded particles 19b protrude from the matrix 17. Even when the protruding particles 19a have disappeared in the secondary sliding, the inner peripheral surface of the shroud 3 is ground by the embedded particles 19b. The protrusion dimension of the embedded particle 19b is not so large. However, since the secondary sliding is relatively moderate, the inner peripheral surface of the shroud 3 is also ground sufficiently by the embedded particles 19b. Thus, the proper clearance C is kept for a long period of time from the operation start, and hence the damage to the rotor blade 9 is prevented. In the abrasive layer 11 as described above, disappearance proceeds easily due to the oxidation of CBN etc. Therefore, the abrasive layer 11 as described above is especially effective for a gas turbine in which the temperature of combustion gas produced in the combustor (temperature at the inlet of the turbine portion 1) is 1200° C. or higher.

The ratio (Np/Nb) of the number of protruding particles 19a (Np) to the number of embedded particles 19b (Nb) in the abrasive layer 11 is preferably not lower than 30/70 and not higher than 80/20. If the ratio (Np/Nb) is lower than 30/70, the grinding capacity at the time of initial sliding may be insufficient. From this point of view, it is especially preferable that the ratio (Np/Nb) be about 50/50. Inversely, if the ratio (Np/Nb) exceeds 80/20, the grinding capacity at the time of secondary sliding may be insufficient. From the viewpoint of efficient grinding, the density of abrasive particles 19 is preferably not lower than 10 particles/mm$^2$ and not higher than 50 particles/mm$^2$.

The average particle diameter of the protruding particles 19a is preferably not smaller than 150 μm and not larger than 200 μm, and the average particle diameter of the embedded particles 19b is preferably not smaller than 80 μm and not larger than 150 μm. If the average particle diameter of the protruding particles 19a exceeds 200 μm, the particle density decreases, which not only exerts an influence on the cutting ability, but also increase the area exposed to the combustion gas, resulting in a decrease in oxidation resistance.

When the number of protruding particles 19a having the average particle diameter smaller than 50 μm is large, or when almost all of the embedded particles 19b have the average particle diameter exceeding 100 μm, it is sometimes difficult to control the thickness of the matrix 17. If almost all of the embedded particles 19b have the average particle diameter smaller than 80 μm, the grinding capacity in the secondary sliding may be insufficient.

In order to easily mix the protruding particles 19a and the embedded particles 19b in the matrix 17, two or more kinds of abrasive layers 11 having different particle size distribution have only to be used by being mixed. Specifically, it is preferable that abrasive particles 19 that pass through #80 mesh but do not pass through #100 mesh and abrasive particles 19 that pass through #100 mesh but do not pass through #120 mesh be mixed. The mesh used should comply with ANSI B74. 16 or FEPA standard (European standard).

Since on the inner peripheral surface of the shroud 3, the heat insulating layer, which is mainly formed of zirconia, or the MCrAlY layer 13 is formed as described above, as the abrasive particles 19, abrasive particles having a hardness greater than that of the coating layer 13 are preferably used. Thereby, the inner peripheral surface of the shroud 3 is ground reliably.

Specifically, the abrasive particles 19 having Vickers hardness (Hv) at ordinary temperature of 1000 or higher, especially 5000 or higher, are preferably used. As the preferred abrasive particles 19, cubic boron nitride particles, alumina particles, silicon carbide particles, and sintered diamond particles can be cited. Two kinds or more among these particles can be used jointly. The especially preferred abrasive particles 19 are cubic boron nitride particles having very high Vickers hardness of about 5000 to 6000 at ordinary temperature.

The matrix 17 functions as a binder for holding the abrasive particles 19 together. As the matrix 17, a oxidation inhibiting material is used. Thereby, the falling-off of the abrasive particles 19 due to oxidation or deterioration of the matrix 17 is restrained. As a preferred oxidation inhibiting material, MCrAlY (an alloy mainly containing iron, nickel or cobalt, chromium, aluminum, and yttrium) can be cited. From the viewpoint of oxidation inhibition, the porosity of the matrix 17 is preferably not higher than 1%.

The thickness of the matrix 17 should usually be not smaller than 50 μm and not higher than 200 μm. If the thickness of the matrix 17 is smaller than 50 μm, not only it is difficult to form the embedded particles 19b but also the binding force of the protruding particles 19a decreases, so that the durability of the abrasive layer 11 becomes insufficient. Inversely, if the thickness of the matrix 17 exceeds 200 μm, both of the protruding particles 19a and the embedded particles 19b are embedded, so that the cutting force is greatly lost.

Figure 4:
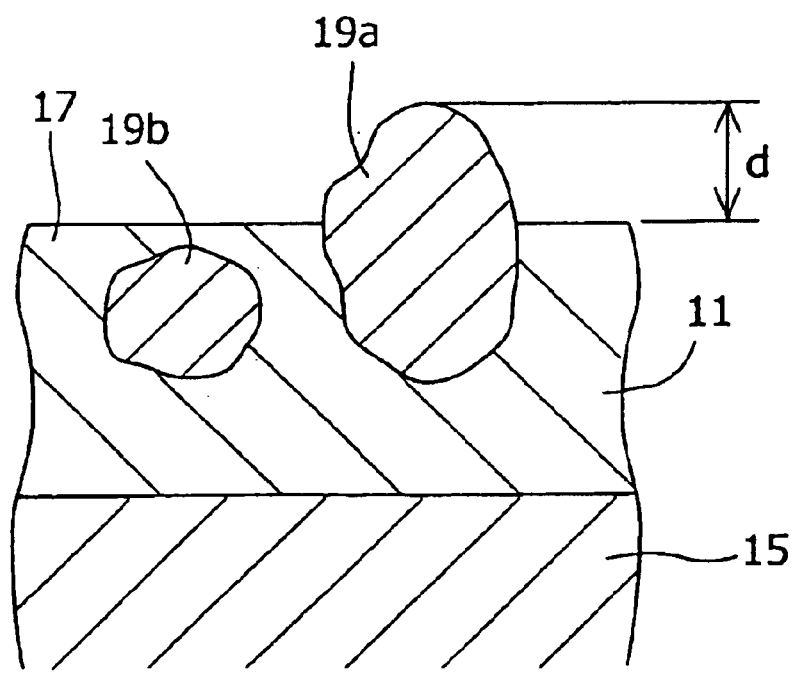
FIG. 4 is a further enlarged sectional view of an abrasive layer shown in FIG. 3.

FIG. 4 is a further enlarged sectional view of the abrasive layer 11 shown in FIG. 3. As described above, the upper ends of the protruding particles 19a protrude from the matrix 17. The dimension indicated by the arrow mark d in this figure is a protrusion dimension of the protruding particle 19a. When the average particle diameter of the protruding particles 19a is taken as D, and the average value of protrusion dimensions d (that is, the average protrusion dimension) of all of the protruding particles 19a is taken as P, the ratio of the average particle diameter D to the average protrusion dimension P (d/D) is preferably not lower than 25% and not higher than 70%. If this ratio is lower than 25%, the grinding capacity may be insufficient due to the embedment of abrasive particles at the time of initial sliding. From this point of view, the ratio should preferably be about 50%. Inversely, if the ration exceeds 55%, the protruding particles 19a may fall off from the matrix 17.

Figure 5:
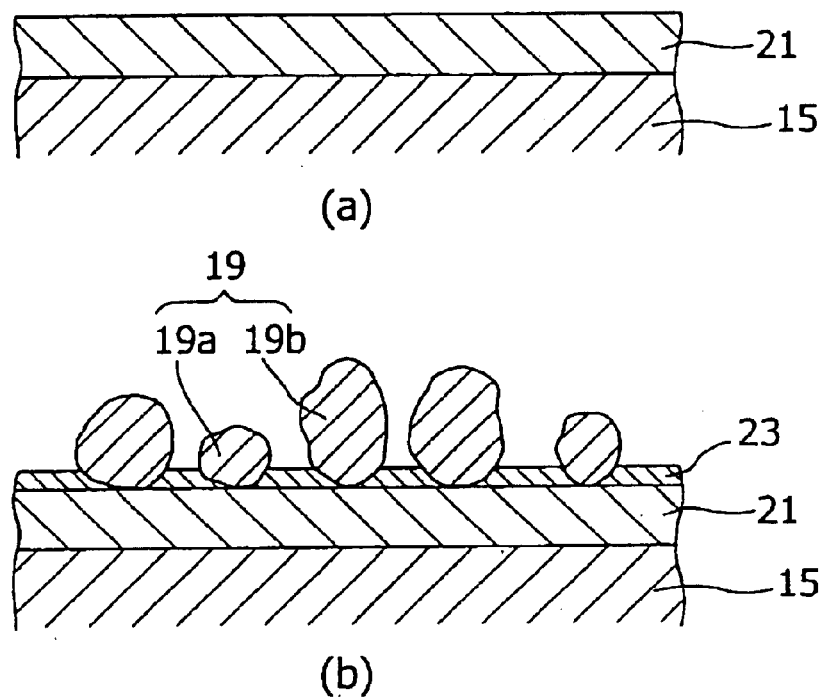
FIG. 5(a) is a schematic sectional view showing a state in which a substrate is formed on a base material in an abrasive layer forming process.
FIG. 5(b) is a schematic sectional view showing a state in which the substrate is coated with a nickel plating layer for temporarily fixing protruding particles on the substrate.

Next, a method for forming the abrasive layer 11 shown in FIG. 3 will be described with reference to FIG. 5. In order to form the abrasive 11, first, portions other than portions in which the abrasive layer 11 is to be formed, of the base material 15 of the rotor blade 9, are masked, and the exposed portions are electroplated with MCrAlY etc. Thereby, a substrate 21 is formed as shown in FIG. 5(a). Next, the base material 15 is nickel electroplated. Thereby, as shown in FIG. 5(b), a nickel plating layer 23 is formed on the surface of the substrate 21, and abrasive particles 19 precipitating in an electrolytic bath are fixed temporarily. The thickness of the nickel plating layer 23 is regulated to a degree such that only the lower part of the abrasive particle 19 is embedded in the nickel plating layer 23. In place of the nickel plating layer 23, a plating layer of a metal other the nickel (for example, chromium) may be used to temporarily fix the abrasive particles 19.

Next, on the nickel plating layer 23, a surface layer consisting of MCrAlY etc. (not shown in FIGS. 5(a) and 5(b)) is further formed by electroplating. The thickness of the surface layer is regulated so that the abrasive particles 19 having a small particle diameter are embedded and the abrasive particles 19 having a large particle diameter are not embedded. Thus, the abrasive layer 11 in which the protruding particles 19a and the embedded particles 19b are mixed is formed. Thereafter, the abrasive layer 11 is heat-treated. Due to this heat treatment, diffusion occurs between the substrate 21, the nickel plating layer 23, and the surface layer, by which the adhesion strength between the layers is increased, and also the components are homogenized between the layers. Thus, the abrasive layer 11 in which the protruding particles 19a and the embedded particles 19b (see FIG. 3) are mixed is formed. With this method, although the fixing treatment of the abrasive particles 19 is done only one time, the abrasive layer 11 in which the protruding particles 19a and the embedded particles 19b are mixed is formed, so that this method offers high work efficiency.

The method for forming the substrate 21 and the surface layer may be thermal spraying or brazing, but plating is preferable because the layer thickness can be regulated easily.

Figure 6:
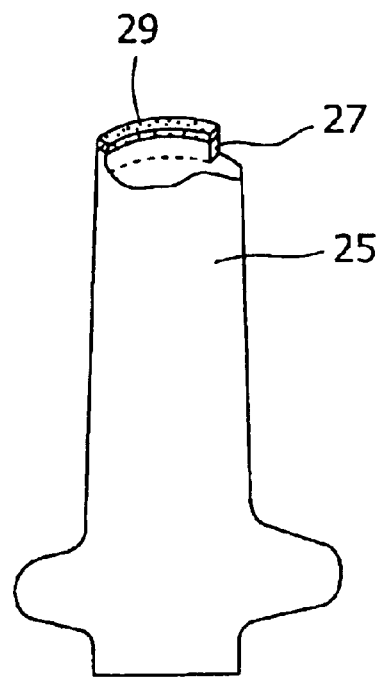
FIG. 6 is a partially sectioned perspective view of a rotor blade of a gas turbine in accordance with another embodiment of the present invention.

FIG. 6 is a partially sectioned perspective view of a rotor blade 25 of a gas turbine in accordance with another embodiment of the present invention. This rotor blade 25 is provided with a ridge portion 27, which protrudes outward in the radial direction along the blade profile, at the tip end thereof. Although not shown in the figure, the shroud 3 (see FIG. 2) is located at the upper part of FIG. 6. In a portion facing the shroud 3 of the ridge portion 27, an abrasive layer 29 is formed. The dotted portion in FIG. 6 is the abrasive layer 29. The configuration of this abrasive layer 29 is approximately equal to that of the abrasive layer 11 of the rotor blade 9 shown in FIG. 2. Specifically, the abrasive layer 29 includes the protruding particles protruding from the matrix and the embedded particles embedded in the matrix.

In this rotor blade 25, the ridge portion 27 first slides on the shroud 3. Since the abrasive layer 29 is formed in the ridge portion 27, the inner peripheral surface of the shroud 3 is ground for a long period of time from the operation start.

Although the present invention has been described in detail taking the case where the abrasive layer is provided at the tip end of the rotor blade as an example in the above description, a similar abrasive layer may be formed on the inner peripheral side of the shroud.

In this case, at least the tip end portion of the rotor blade is formed of a material with a low hardness, and hence the rotor blade is ground by sliding.

Also, although the turbine portion of an industrial gas turbine has been taken as an example in the above description, the present invention can be applied to all combustion engines in which the rotor blade slides on the shroud, such as a jet engine on the side of a gas turbine compressor.

Further, the abrasive layer of the present invention achieves an effect of keeping a proper clearance in all applications in which the movable portion and the non-movable portion facing each other are provided, and the movable portion may slide on the non-movable portion.

INDUSTRIAL APPLICABILITY

As described above, by forming the abrasive layer in accordance with the present invention, a proper clearance is kept between the movable portion and the non-movable portion for a long period of time. If this abrasive layer is formed in the combustion engine, especially in the gas turbine, damage to the rotor blade is less liable to occur, and thus the reliability of the combustion engine is improved.

What is claimed is:

1. A combustion engine comprising a compressor, a combustor, and a turbine portion, said turbine portion having a rotor blade and a shroud facing a tip end of said rotor blade, wherein an abrasive layer having a matrix and many abrasive particles dispersed in said matrix is formed at tip end portion of said rotor blade, some of said abrasive particles are dispersed so as to protrude from said matrix and the remaining abrasive particles are dispersed so as to be embedded in said matrix, and the ratio (Np/Nb) of the number of particles protruding from said matrix (Np) to the number of particles embedded in said matrix (Nb) is not lower than 30/70 and not hither than 80/20.

2. The combustion engine according to claim 1, wherein two or more kinds of abrasive particles having different particle size distribution are dispersed in said abrasive layer.

3. The combustion engine according to claim 2, wherein abrasive particles that pass through #80 mesh but do not pass through #100 mesh and abrasive particles that pass through #100 mesh but do not pass through #120 mesh are mixedly used in said abrasive layer.

4. The combustion engine according to claim 2, wherein the average particle diameter of abrasive particles protruding from said matrix is not smaller than 150 $\mu$m and not larger than 200 $\mu$m, and the average particle diameter of abrasive particles embedded in said matrix is not smaller than 80 $\mu$m and not larger than 150 $\mu$m.

5. The combustion engine according to claim 1, wherein the average particle diameter of abrasive particles protruding from said matrix is not smaller than 150 $\mu$m and not larger than 200 $\mu$m, and the average particle diameter of abrasive particles embedded in said matrix is not smaller than 80 $\mu$m and not larger than 150 $\mu$m.

6. The combustion engine according to claim 1, wherein a number density of the abrasive particles in the matrix is not lower than 10 particles/mm$^2$ and not higher than 50 particles/mm$^2$.

7. The combustion engine according to claim 1, wherein a thickness of the matrix is greater than or equal to 50 $\mu$m and less than 200 $\mu$m.

8. A combustion engine comprising a compressor, a combustor, and a turbine portion, said turbine portion having a rotor blade and a shroud facing a tip end of said rotor blade, wherein an abrasive layer having a matrix and many abrasive particles dispersed in said matrix is formed at the tip end portion of said rotor blade, some of said abrasive particles are dispersed so as to protrude from said matrix and the remaining abrasive particles are dispersed so as to be embedded in said matrix, and the average particle diameter of abrasive particles protruding from said matrix is taken as D, the average protrusion dimension thereof is taken as P, and the ratio of the average particle diameter D to the average protrusion dimension P is not lower than 25% and not higher than 70%.

9. The combustion engine according to claim 1, wherein said abrasive particles have a hardness higher than that of a material forming the inner peripheral surface of said shroud.

10. The combustion engine according to claim 9, wherein the inner peripheral surface of said shroud is a coating layer formed mainly of zirconia or a coating layer comprising M-Cr—Al—Y, and one or more kinds of particles selected from a group consisting of cubic boron nitride particles, alumina particles, silicon carbide particles, and sintered diamond particles are used as the abrasive particles.

11. The combustion engine according to claim 1, wherein the porosity of said matrix is not higher than 1%.

12. The combustion engine according to claim 1, wherein said matrix is formed mainly of M-Cr—Al—Y.

13. The combustion engine according to claim 8, wherein a number density of the abrasive particles in the matrix is not lower than 10 particles/mm$^2$ and not higher than 50 particles/mm$^2$.

14. The combustion engine according to claim 8, wherein a thickness of the matrix is greater than or equal to 50 μm and less than 200 μm.

15. A combustion engine comprising a compressor, a combustor, and a turbine portion, said turbine portion having a rotor blade and a shroud facing a tip end of said rotor blade, wherein said rotor blade is provided with a ridge portion, which protrudes outward in the radial direction, at the tip end thereof, said ridge portion is formed with an abrasive layer having a matrix and many abrasive particles dispersed in said matrix, some of said abrasive particles are dispersed so as to protrude from said matrix and the remaining abrasive particles are dispersed so as to be embedded in said matrix, and the ratio (Np/Nb) of the number of particles protruding from said matrix (Np) to the number of particles embedded in said matrix (Nb) is not lower than 30/70 and not hither than 80/20.

16. A combustion engine comprising a compressor, a combustor, and a turbine portion, said turbine portion having a movable portion and a non-movable portion facing each other, wherein on either one of a surface facing said non-movable portion of said movable portion and a surface facing said movable portion of said non-movable portion, an abrasive layer having a matrix and many abrasive particles dispersed in said matrix is formed, some of said abrasive particles are dispersed so as to protrude from said matrix and the remaining abrasive particles are dispersed so as to be embedded in said matrix, and the ratio (Np/Nb) of the number of particles protruding from said matrix (Np) to the number of particles embedded in said matrix (Nb) is not lower than 30/70 and not higher than 80/20.

17. A gas turbine comprising a compressor, a combustor, and a turbine portion, said turbine portion having a rotor blade and a shroud facing a tip end of said rotor blade, wherein an abrasive layer having a matrix and many abrasive particles dispersed in said matrix is formed at the tip end portion of said rotor blade, some of said abrasive particles are dispersed so as to protrude from said matrix and the remaining abrasive particles are dispersed so as to be embedded in said matrix, and the ratio (Np/Nb) of the number of particles protruding from said matrix (Np) to the number of particles embedded in said matrix (Nb) is not lower than 30/70 and not higher than 80/20.

18. The gas turbine according to claim 17, wherein the temperature of a combustion gas produced in said combustor at the inlet of said turbine portion is not lower than 1200° C.

19. An abrasive layer which is provided with a matrix and many abrasive particles dispersed in said matrix and is formed on either one surface of a movable portion and non-movable portion facing each other, such as a tip end portion of a rotor blade and a shroud, wherein some of said abrasive particles are dispersed so as to protrude from said matrix and the remaining abrasive particles are dispersed so as to be embedded in said matrix, and the ratio (Np/Nb) of the number of particles protruding from said matrix (Np) to the number of particles embedded in said matrix (Nb) is not lower than 30/70 and not higher than 80/20.

20. A combustion engine comprising a compressor, a combustor, and a turbine portion, said turbine portion having a rotor blade and a shroud facing a tip end of said rotor blade, wherein said rotor blade is provided with a ridge portion, which protrudes outward in the radial direction, at the tip end thereof, said ridge portion is formed with an abrasive layer having a matrix and many abrasive particles dispersed in said matrix, some of said abrasive particles are dispersed so as to protrude from said matrix and the remaining abrasive particles are dispersed so as to be embedded in said matrix, the average particle diameter of abrasive particles protruding from said matrix is taken as D, the average protrusion dimension thereof is taken as P, and the ratio of the average particle diameter D to the average protrusion dimension P is not lower than 25% and not higher than 70%.

21. A combustion engine comprising a compressor, a combustor, and a turbine portion, said turbine portion having a movable portion and a non-movable portion facing each other, wherein on either one of a surface facing said non-movable portion of said movable portion and a surface facing said movable portion of said non-movable portion, an abrasive layer having a matrix and many abrasive particles dispersed in said matrix is formed, some of said abrasive particles are dispersed so as to protrude from said matrix and the remaining abrasive particles arc dispersed so as to be embedded in said matrix, the average particle diameter of abrasive particles protruding from said matrix is taken as D, the average protrusion dimension thereof is taken as P, and the ratio of the average particle diameter D to the average protrusion dimension P is not lower than 25% and not higher than 70%.

22. A gas turbine comprising a compressor, a combustor, and a turbine portion, said turbine portion having a rotor blade and a shroud facing a tip end of said rotor blade, wherein an abrasive layer having a matrix and many abrasive particles dispersed in said matrix is formed at the tip end portion of said rotor blade, some of said abrasive particles are dispersed so as to protrude from said matrix and the remaining abrasive particles are dispersed so as to be embedded in said matrix, the average particle diameter of abrasive particles protruding from said matrix is taken as D, the average protrusion dimension thereof is taken as P, and the ratio of the average particle diameter D to the average protrusion dimension P is not lower than 25% and not higher than 70%.

23. The gas turbine according to claim 22, wherein the temperature of a combustion gas produced in said combustor at the inlet of said turbine portion is not lower than 1200° C.

24. An abrasive layer which is provided with a matrix and many abrasive particles dispersed in said matrix and is formed on either one surface of a movable portion and non-movable portion facing each other, such as a tip end portion of a rotor blade and a shroud, wherein some of said abrasive particles are dispersed so as to protrude from said matrix and the remaining abrasive particles are dispersed so as to be embedded in said matrix, the average particle diameter of abrasive particles protruding from said matrix is taken as D, the average protrusion dimension thereof is taken as P, and the ratio of the average particle diameter D to the average protrusion dimension P is not lower than 25% and not higher than 70%.

* * * * *